United States Patent [19]

Johnson

[11] 3,976,285

[45] Aug. 24, 1976

[54] SEALING ARRANGEMENT FOR AN EXTRUSION APPARATUS

[75] Inventor: David E. Johnson, Macedon, N.Y.

[73] Assignee: Mobil Oil Corporation, New York, N.Y.

[22] Filed: Nov. 13, 1974

[21] Appl. No.: 523,395

[52] U.S. Cl. ................... 259/191; 259/DIG. 16; 264/176 R; 425/208; 425/466
[51] Int. Cl.² ............................................ A23C 1/06
[58] Field of Search ............ 259/191, 192; 308/277; 264/176 R; 277/106, 134; 425/466, 208

[56] References Cited
UNITED STATES PATENTS

| | | | |
|---|---|---|---|
| 1,504,901 | 8/1924 | Rogers | 277/106 |
| 2,283,348 | 5/1942 | Adams et al. | 277/106 |
| 2,302,578 | 11/1942 | Ferrell | 277/134 |
| 2,362,436 | 11/1944 | Strafford | 277/134 |
| 3,450,392 | 6/1969 | Viareat | 277/106 |
| 3,659,862 | 5/1972 | Sebestian | 277/106 |
| 3,700,247 | 10/1972 | Butler et al. | 259/191 |
| 3,738,618 | 6/1973 | Hehl | 259/191 |
| 3,752,489 | 8/1973 | Latinen | 259/191 |
| 3,811,658 | 5/1974 | Heidrich | 259/191 |
| 3,821,129 | 6/1974 | Johnson | 260/2.5 E |

*Primary Examiner*—Jay H. Woo
*Attorney, Agent, or Firm*—Charles A. Huggett; James D. Tierney

[57] ABSTRACT

In a method and apparatus for the extrusion of thermoplastic resinous materials and in particular coarse granular resinous materials which contain admixed therewith fine, powdery additives, a seal is provided for the extrusion apparatus to prevent escape or leakage therefrom of the fine powdery additive material admixed with the coarser granular resin.

1 Claim, 5 Drawing Figures

SEALING ARRANGEMENT FOR AN EXTRUSION APPARATUS

BACKGROUND OF THE INVENTION

The present invention relates to the extrusion of thermoplastic resinous materials and in particular granular thermoplastic resinous materials which are admixed with additive amounts of fine powdery materials. Specifically, such admixtures may be encountered in the extrusion of thermoplastic foams such as polystyrene foam. In general, in a direct injection process, polystyrene foam is produced by feeding granular polystyrene resin pellets to the feed hopper of an extrusion apparatus where the polystyrene granules are thereupon fed into the extruder proper. The continuously rotating extruder screw forwards the polystyrene granules as they are heated and melted to form a molten mass which continues to be forwarded by the screw. At some point after the polystyrene has been completely melted, a blowing agent such as, for example, a freon, pentane, isopentane or the like is introduced through the extruder barrel and is thoroughly admixed with the molten polystyrene resin. Finally, the mixture of blowing agent and molten polystyrene is expressed through a die orifice whereupon the sudden reduction in pressure causes the gasification of the major portion of the blowing agent which results in the formation of a foam structure upon cooling. It has been found in the prior art that, in order to control the cell size of the individual cells contained in the polystyrene foam, a cell size control additive must be added to the polystyrene blowing agent mixture before it is extruded. Cell size control is important since the size and uniformity of the foam cells determines the physical characteristics of the final foam product, e.g. stiffness, toughness, brittleness, flexibility, etc. It has been found that when materials such as talc, silica, mixtures of citric acid and sodium bicarbonate, and other materials are added in precisely controlled amounts and, in the case of a 2-component nucleating system, in stoichiometric ratios, the size of the cells in the final foam produce may be controlled within defined limits. Further, it has been found that it is desirable that such cell size control additive materials be admixed with the polystyrene resin pellets prior to their introduction into the barrel of the extruder. In a conventional extrusion system the point of introduction of the resin and cell size control agent is at the feed hopper of the extruder. This point of introduction is immediately adjacent to the extruder throat, i.e. that portion of the extruder screw and barrel beyond which the shank end of the screw extends out of the extruder barrel and into engagement with the extruder screw drive and thrust mechanism. A suitable seal must surround that portion of the extruder screw shank intermediate the hopper zone and the end of the extruder barrel to insure that leakage of resin and, in particular, fine powdery additives out of the back end of the extruder does not occur. Additionally, return flights are machined into the shank of the extruder screw in this seal area to insure that material which does leak back between the screw shank and barrel is positively returned by the forwarding action of these return flights. Obviously, a defective or inadequate sealing of the clearance space surrounding the screw shank at the point where it leaves the extruder barrel will result in an undesirable leakage of the fine, powdery cell size control additive through this clearance and out of the extruder. Such leakage of cell size control additive powder makes it difficult, if not impossible, to maintain a precise amount of cell size control additive in the extrusion system. As hereinbefore noted, precisely controlled amounts of such additive materials are necessary in the extrusion system to control the individual cell size in the final foam product within a particular defined range of cell size. Hence, loss of random amounts by leakage of the additive material from the extruder proper through ineffective or defective seal arrangements inhibits, or makes impossible, effective cell size control in the final foam product.

When designing a seal arrangement for an extruder apparatus, factors which must be taken into consideration include the temperature and pressure conditions to which the seal will be exposed, rotational velocity of the extruder screw, the medium which is to be sealed, and the extruder screw run out. These are basic considerations for rotary seal design. In the case of foam extrusion employing a fine powdery cell size control additive, the sealing problem is complicated with frictional heat, rolling pressure, the medium, i.e. the powder being sealed, and the rotational run out of the screw. By rotational run out of the screw is meant that the screw shank portion in the area of the extruder throat being sealed does not rotate around its geometrical center. This results in a given point on the circumference of the screw shaft circumscribing a path greater than the screw diameter as the screw rotates, resulting in an up-and-down and side-to-side motion of the turning screw shank. This run out is primarily caused by forces which act on the screw in the screw thrust and drive mechanism. For example, spaced apart sets of bearings which support the screw in the drive area may be slightly misaligned. This misalignment causes the screw shank to rotate about an axis which is offset from the true geometrical center of the screw resulting in eccentric rotation of the screw. A rubber seal surrounding the screw shank in the extruder throat might flex to accommodate this rotational run out of the screw and remain in continuous sealing relationship around the periphery of the screw, but sealing materials such as rubber require lubrication and cooling. Moreover, the nature of the material being sealed, i.e. a fine powdery material, when admixed with a lubricant such as oil, which is present in the seal area, forms an abrasive paste which causes errosion and subsequent failure of such a rubber seal. Another alternative would be to employ, in place of a rubber seal, a bronze bushing which would surround the screw in the area it is desired to seal. Such bronze bushings are conventionally fixed in place and, therefore, the rotational run out of the screw, hereinbefore described, would cause errosion and abrasion on the inner surface of the bushing resulting in the formation of a gap between the bushing and the rotating screw allowing the powdery additive material to leak through the gap, past the seal, and out of the extruder at a high rate.

SUMMARY OF THE INVENTION

The present invention relates to a method and apparatus for sealing powdery additive materials within the confines of an extrusion system. This is accomplished by employing a metalic seal element, such as, for example, a sintered bronze bushing which is mounted around the rotating screw shaft in such a manner that the bronze bushing will float or move from side to side or up and down to accommodate the rotational run out of the screw as it is turning. The floating bushing is fixed so that it does not rotate with the screw and further it is spring loaded so that the forward portion of the bushing remains in close contact with a wear-ring element thereby preventing radial leakage of the powdery material through the seal.

In particular, the present invention relates to a method and apparatus adapted for the extrusion of thermoplastic resin foam from a mixture comprising granular thermoplastic resin, a volatile blowing agent and fine powdery cell size control additives. The extrusion apparatus comprises an elongated screw which is disposed inside of an elongated barrel housing. One end of the barrel housing comprises a throat section through which the shank end of the extruder screw extends outside of the barrel housing and into operative engagement with a rotary drive means. There is provided a unique sealing means in the extruder throat section which includes a circular bushing surrounding that portion of the extruder screw which passes through the extruder throat. The bushing is mounted on spring elements which permit free radial displacement of the bushing by the screw as it rotates, circumscribing an eccentric path. Also, the bushing is spring loaded so that it continually bears against a wear-ring to preclude radial leakage of the powdery materials which it is desired to seal within the extrusion system.

DESCRIPTION OF THE SPECIFIC EMBODIMENTS

Figure 1:
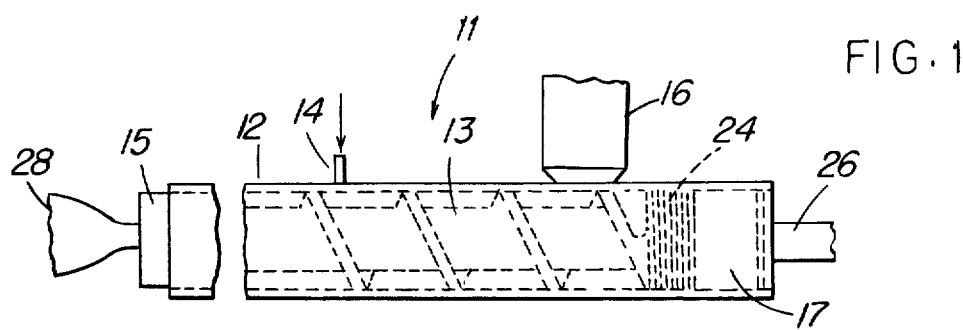
FIG. 1 is a schematic representation of a thermoplastic extrusion system.

As shown in FIG. 1, there is a schematic representative arrangement of an apparatus which may be employed in the direct injection extrusion process for the production of foam material such as polystyrene foam. The extruder 11 comprises a feed hopper 16 into which there is fed a mixture of relatively coarse granular polystyrene resin and the fine powdery cell size control additive materials such as, for example, a mixture of citric acid and sodium bicarbonate present in stoichiometric amounts. As the resin-additive mixture is gravitationally fed from the hopper 16 into the extruder 11, the rotating extruder screw 13 advances the resin towards the outlet end of the extruder and through the extrusion die 15. As screw 13 advances the resin-additive mixture, this mixture is continually heated, for example by electrical band heaters (not shown) which surround extruder barrel 12. By the time the resin additive mixture reaches the blowing agent injection port 14, the materials are completely melted, i.e. they are in a thoroughly mixed and molten condition prior to injection of the blowing agent which in the case of polystyrene foam extrusion, may be pentane, isopentane, or freon for example. Following injection of the pentane into the molten resin-additive mixture, the materials are thoroughly mixed as they are forwarded by extruder screw 13 downstream of the blowing agent injection port 14. Finally, the molten mixture is expressed through the orifice of die member 15 to form the desired foam shape 28.

Figure 2:
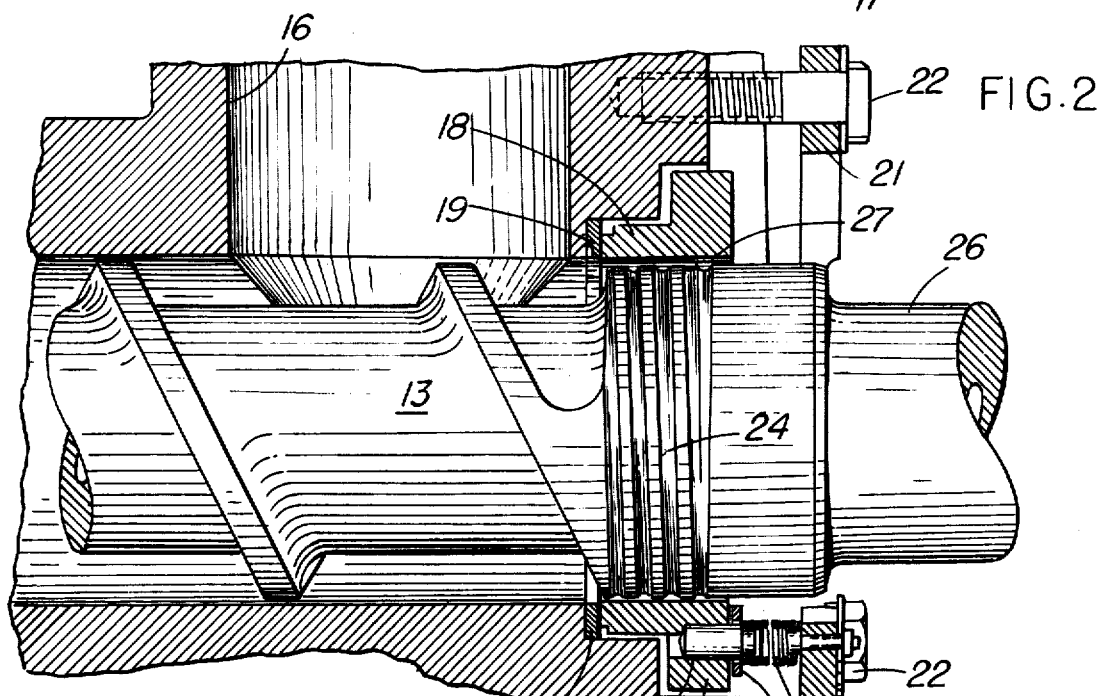
FIG. 2 is a diagrammatic view, partially in cross-section, of a portion of the extruder shown in FIG. 1.

As shown in cross-section in FIG. 2, the extruder throat area 17 is located upstream from the point of resin feed into the extruder 11. In the extruder throat area 17, i.e. that area where the extruder screw shank 26 exits from extruder barrel 12 extruder screw 13 has a shallow, short pitch return flight 24 which assists in forwarding materials which flow back into this extruder throat area back downstream into the extrusion system. A seal member in the form of a circular bronze bushing 18 surrounds extruder screw shank 26 in the area of the return flight 24. Materials other than sintered bronze which may be used to form bushing 18 include oil impregnated sintered babbit, oil impregnated meehanite, glass reinforced phenolic, nylon, oil impregnated maple wood and the like. Desirably, bushing 18 is fabricated from sintered bronze which has been impregnated with oil (oilite). Bushing 18 abuts against circular-wear ring 19 which is positioned around and adjacent to the forward end of the return flights 24. Bushing 18 may be considered a "floating bushing" since as a result of its unique spring mounting around the screw shank 26 it is able to float up and down and from side to side to accommodate the rotational run out of extruder screw 13 in the area of the return flight 24. Additionally, by virtue of its spring loading, the downstream face of bushing 18 is continually urged in abutting relationship against wear-ring 19 to prevent radial leakage of the fine powdery materials which may migrate back into throat section 17. Polystyrene fines and the cell size control additive powders which do escape from the extrusion system into the throat area 17 and into the interface between wear-ring 19 and bushing 18 are compacted and form a thin surface covering between ring 19 and bushing 18 thereby providing an excellent wear surface for these two elements.

As shown in FIG. 2, there is a radial clearance shown as gap 27 intermediate the inner surface of bushing element 18 and the surface of the return flights on the extruder screw shank 26. Ideally, this radial spacing should be on the order of about 0.002 inches. As powdery-fine materials leak back into extruder throat section 17, they enter hereinbefore defined gap 27. The forces acting upon such fine materials in this area, i.e. the continual rotary motion of the return flight 24, forces the fine powdery material back from throat section 17 and causes it to reenter the extrusion system proper where it is advanced downstream by extruder screw 13. A portion of this fine powdery material may become compacted and form a relatively thin surface coating around the interior surface of bushing 18. This coating acts as an excellent wear agent intermediate the interface of bushing 18 with the return flighted portion of extruder screw shank 26.

Figures 3, 4:
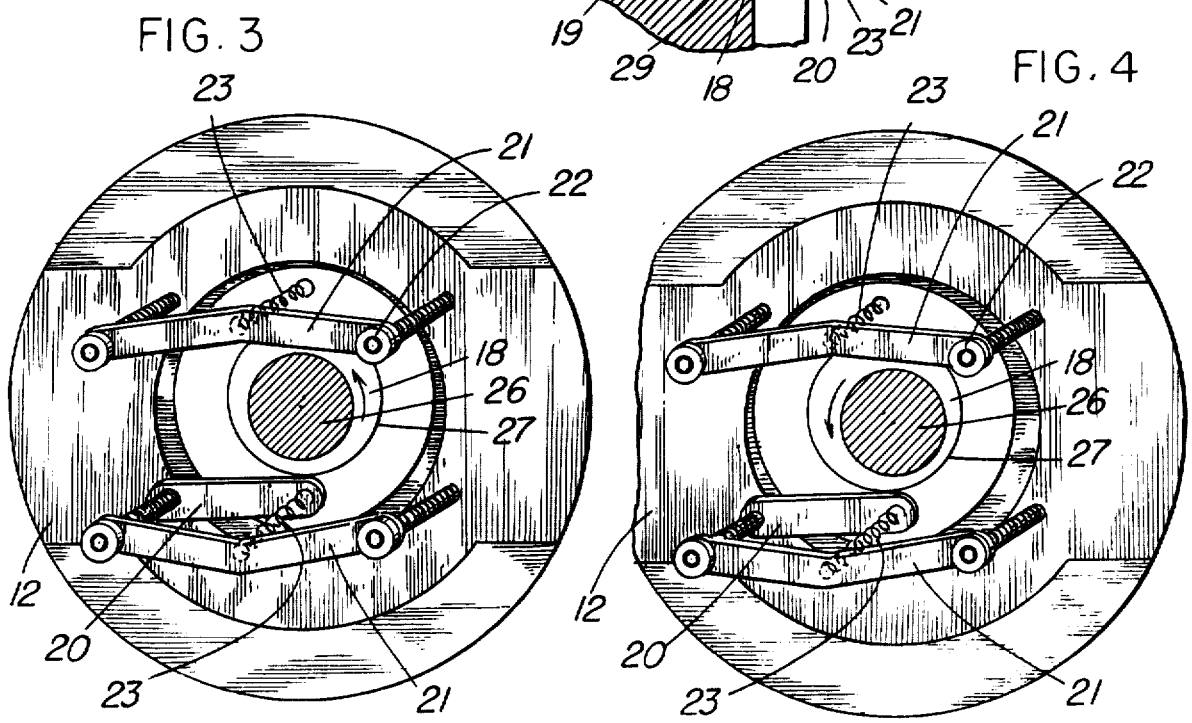
FIGS. 3 and 4 are schematic end views of the extruder sealing mechanism in accordance with the present invention.
Figure 5:
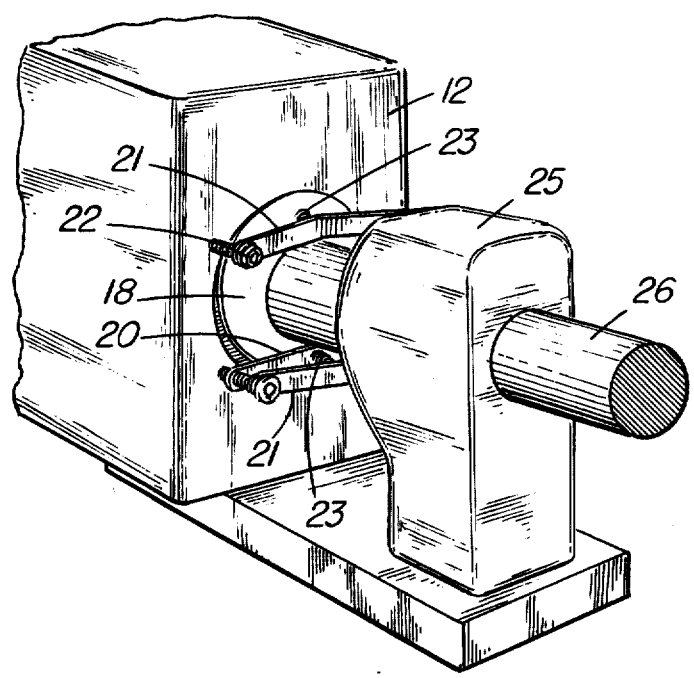
FIG. 5 is a fragmentary view of the relationship of the extruder drive and thrust housing with the location of the sealing mechanism of the present invention.

FIGS. 3 and 4 are schematic representations of the mounting system for floating bushing 18. The end of extruder shank 26 is cut away for the sake of clarity of illustration. The radial movement of bushing 18 is illustrated as screw shank 26 is rotated, in an eccentric fashion, from the position shown in FIG. 3 to a second position as shown in FIG. 4. The bushing 18 is displaced from that shown in FIG. 3 as a result of eccentric rotation of shaft 26 to the position as illustrated in FIG. 4. As shown in FIGS. 3 and 4 floating bushing 18 is supported by an upper and lower spring bar elements 21. Bushing 18 is connected to spring bars 21 through individual spring elements 23. An anti-rotation link 20 is employed to prevent floating bushing 18 from rotating with rotating screw shank 26. One end of anti-rotation link 20 is pivotally connected to a spring bar retaining screw 22; the opposite end thereof is pivotally connected to spring locating pin 29. It will be seen from the illustrations in FIGS. 3 and 4, the only connection of floating bushing 18 with spring bar elements 21 are spring members 23. Accordingly, as seen from the radial displacement of bushing 18, as illustrated in FIGS. 3 and 4, these springs 23 allow bushing 18 to float radially as the interior sealing surface of bushing 18 is displaced by rotating screw shank 26 which as hereinbefore described, rotates in an eccentric fashion. This displacement capability of bushing 18, allowing it to accommodate itself to the run out of the rotating screw, insures not only an effective sealing of the extruder throat, but also insures a long, maintenance-free life for such a sealing arrangement since the errosive action of rotating screw shank 26 against the sealing surface fixed or stationary element has now been minimized.

The following is a specific example which employs the sealing method and apparatus of the present invention. This example is given by way of illustration only and is in no way intended as limitative of the scope of the invention.

EXAMPLE I

Polystyrene pellets of approximately 1/16 inch diameter (supplied by the Foster Grant Company and identified as F. G. −50S) were admixed with a cell size control additive mixture comprising about 0.86 percent by weight of a mixture of sodium bicarbonate and citric acid, in a bicarbonate to acid ratio of about 1:0.76. The cell size control additive was a fine powdery mixture and was utilized in the extrusion process to control the cell size of the individual cells in the final polystyrene foam product. The mixture of polystyrene pellets and cell size control additive was discharged through feed hopper 16 into extruder 11 onto the surface of rotating extruder screw 13. Rotating screw 13 conveyed the major portion of this mixture downstream of extruder barrel 12 to a heat plasticizing zone which was maintained at a temperature of about 400° to about 450°F. The resulting molten mass was then continually progressed by extrusion screw 13 to a blowing agent injection zone 14 where approximately 5% by weight of isopentane (based on the total weight of polystyrene) was pumped into the molten resin at a pressure of approximately 2,000 lbs. per sp. in. with the temperature in the injection zone being maintained from 400°–450°F. The pentane-molten polymer mixture was continuously mixed and forwarded to the die end of the extruder 11 where it was extruded as a tube 28 through annular die member 15.

The throat end of extruder 11 immediately adjacent to the feed hopper 16 was equipped with a sintered bronze oilite bearing 18 which surrounded the return flight portion 17 of extruder screw shank 26 in extruder throat zone 17. Bushing 18 was spring mounted, as previously described, on spring bar elements 21. Extruder screw 13 had a cross-sectional diameter of 4.5 inches and a length to diameter ratio of 24:1. After operation of the extruder for periods of up to 330 days, there was no visible indications of leakage of cell size control powder or resin fines outside of extruder throat area 17. Additionally, the polystyrene foam product produced was characterized by having a uniform cell size radius within a defined range of from about 0.004 inch to about 0.005 inch. The continuous uniformity of the cell size of the extruded foam product reflects the positive containment of the cell size control mixture within the extrusion system as a result of the sealing action of floating bushing member 18 in the extruder throat section 17.

EXAMPLE II

Utilizing the same apparatus, feed mixture, additives, temperatures and pressures described in foregoing Example I, polystyrene foam was extruded to form tube 28. No floating bushing 18 however was employed in the throat section 17. In its place, a conventional stuffing box with braided packing was used as the throat sealing element. It was observed that after only 21 days of operation, copious amounts of cell size control additive powder was leaking out of the extrusion system through extruder throat 17. This random loss of cell size control additive mixture made it impossible to meter stoichiometric amounts of the cell size control mixture into the extrusion system. Loss of cell size control additive was reflected in the wide variation of the cell size of the foam produced as measured at various intervals during the extrusion operation.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. An extrusion apparatus, adapted for the production of thermoplastic resin foam from a mixture comprising granular thermoplastic resin, a volatile blowing agent and a fine powdery cell size control additive, comprising an elongated screw disposed inside of an elongated barrel housing, one end of said barrel housing comprising a throat section through which one end of said extruder screw extends, outside of said barrel housing, into operative engagement with a rotary drive means, sealing means in said extruder throat section comprising a circular bushing, said bushing surrounding said screw in said throat section and said bushing being mounted on flexible elements whereby said bushing is free to be radially displaced by said screw as said screw rotates.

* * * * *